Sept. 11, 1962　　　C. T. HOLLAND　　　3,052,997
TRUE GRADE APPARATUS
Filed July 12, 1961　　　3 Sheets-Sheet 1
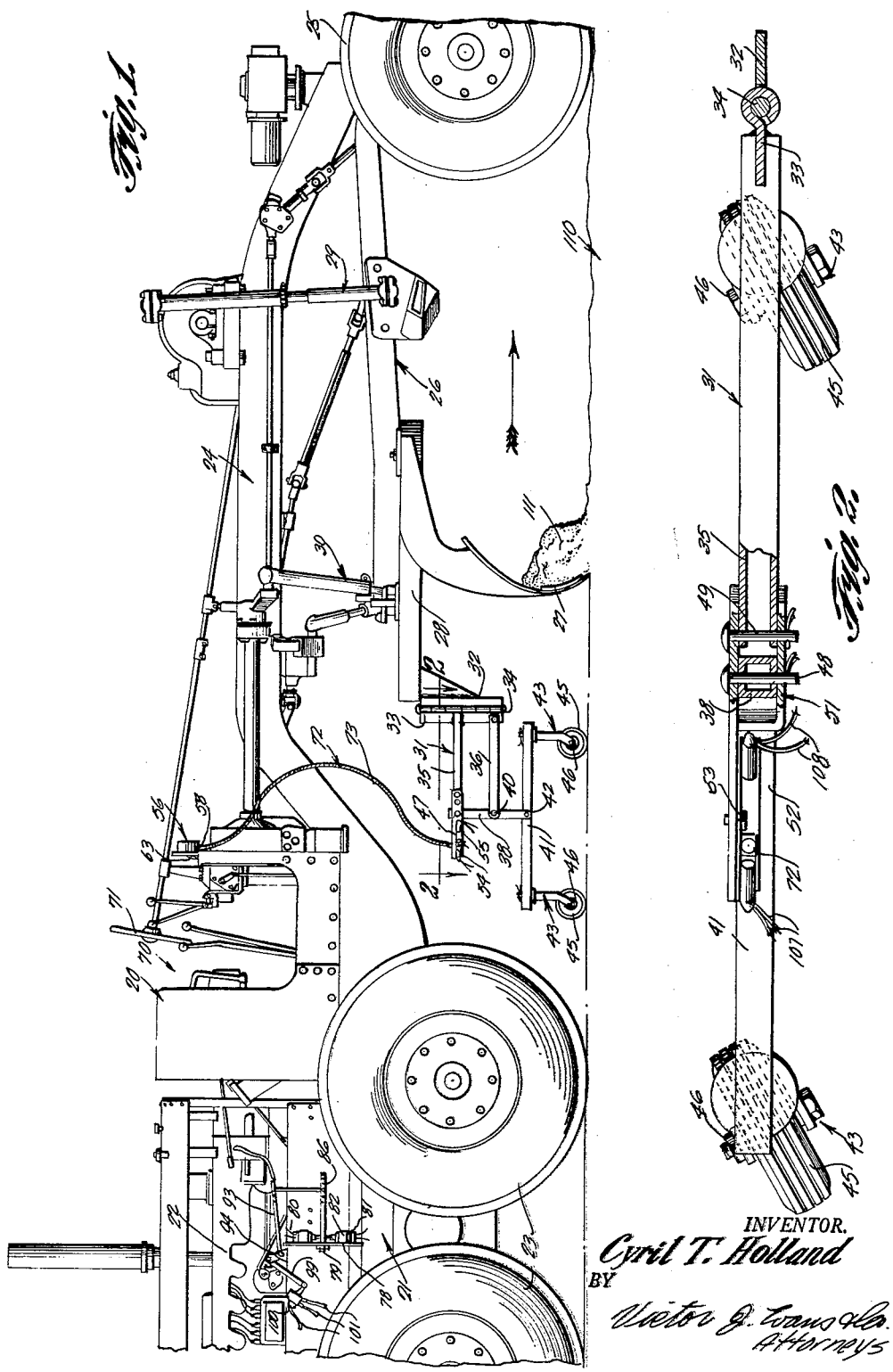
INVENTOR.
Cyril T. Holland
BY
Victor J. Evans & Co.
Attorneys

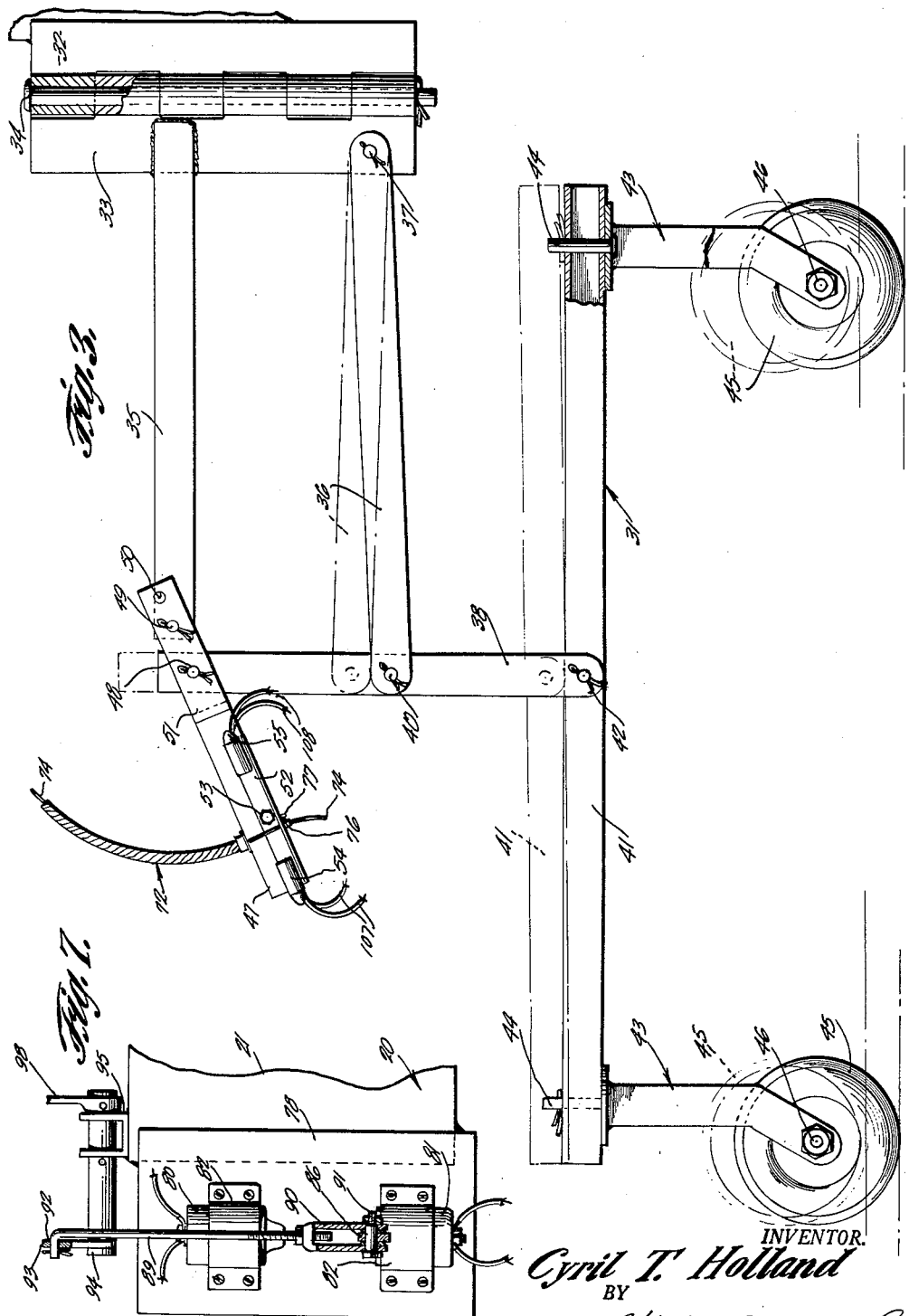

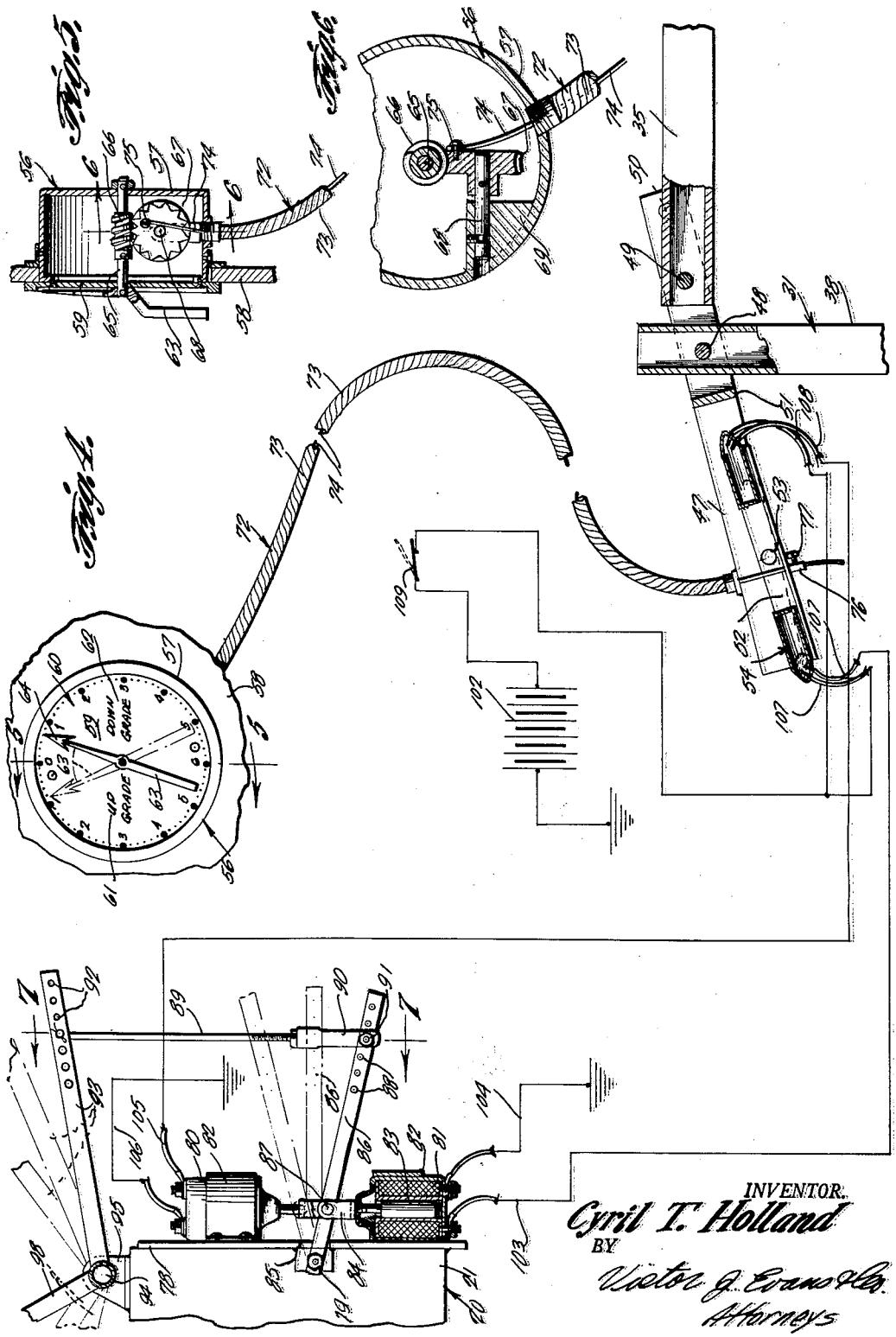

United States Patent Office 3,052,997
Patented Sept. 11, 1962

3,052,997
TRUE GRADE APPARATUS
Cyril T. Holland, Beryl, Utah
Filed July 12, 1961, Ser. No. 123,453
2 Claims. (Cl. 37—143)

The present invention relates to an earth moving machine, and more particularly to an attachment or mechanism for such a machine wherein a true grade can be automatically maintained during use of the machine.

The primary object of this invention is to provide an earth moving machine which includes a movable blade, and wherein according to the present invention there is provided a mechanism or attachment for maintaining a true grade so that for example when the machine is being used for leveling land for any purpose such as in connection with irrigation of farm land, highway construction work or any other jobs, the machine will automatically perform the job of leveling the land at a desired grade without the necessity of manually adjusting the blade.

Another object of the present invention is to provide a true grade mechanism which can be used with various types of earth moving machinery such as a land leveler or grader, as well as with a tractor operated scraper blade or the like, and wherein the present invention includes a means for adjusting the mechanism to permit the mechanism to adjust to an upgrade, downgrade, or the like.

Another object is to provide an apparatus of the character described that may be utilized speedily and with precision by even inexperienced operators.

Further objects and advantages are to provide improved elements and arrangements thereof in a device of the character described that is economical to produce, durable in form, and conducive to the most economical use of materials and uniformity of members formed therefrom.

Still further objects and advantages will become apparent in the subsequent description in the specification.

In the drawings:

FIGURE 1 is a fragmentary side elevational view illustrating an earth moving machine such as a land leveler or grader equipped with the true grade mechanism or attachment of the present invention.

FIGURE 2 is an enlarged sectional view taken on the line 2—2 of FIGURE 1.

FIGURE 3 is an enlarged side elevational view illustrating a portion of the present invention.

FIGURE 4 is a schematic view illustrating certain constructional details of the present invention and showing the wiring diagram schematically.

FIGURE 5 is a sectional view taken on the line 5—5 of FIGURE 4.

FIGURE 6 is a sectional view on the line 6—6 of FIGURE 5.

FIGURE 7 is a sectional view taken on line 7—7 of FIGURE 4.

Referring in detail to the drawings, the numeral 20 indicates a portion of a conventional motor grader or earth moving machine which includes the usual body 21 that may have an engine 22 of a suitable type therein for providing power for operating the machine, and the machine 20 is further provided with the usual ground engaging wheels 23. The machine 20 further includes the usual forwardly projecting frame portion 24 which has ground engaging wheels 25 adjacent the front end thereof, and the numeral 26 indicates a movable support section which is adjustably mounted therebelow the frame 24, and a ground engaging blade 27 is suitably and operatively connected to the support section 26 in the usual manner. The numeral 28 indicates the usual ring gear unit which is arranged adjacent the blade 27. Hydraulic cylinders 29 and 30 are provided for raising or lowering the support section 26, whereby the blade 27 can be raised or lowered, and it is to be understood that the blade 27 is also capable of tilting an angular adjustment or movement in the usual manner.

According to the present invention there is provided a true grade mechanism or attachment which is indicated generally by the numeral 31, and it will be seen that the mechanism or attachment 31 includes a base piece 32 that is secured as by welding to the unit 28, and the numeral 33 indicates a movable element that is hingedly connected as at 34 to the base piece 32.

The numeral 35 indicates a horizontal disposed bar which has its front end secured as by welding to the movable element 33, and there is provided an arm 36 which has its front end pivotally connected to the movable element 33 as at 37, and the arm 36 is arranged below the bar 35. The numeral 38 indicates a vertically disposed standard which has the rear end of the arm 36 pivotally connected thereto as at 40, and the lower end of the standard 38 is pivotally connected to a beam 41 as at 42. Support units 43 are connected to the front and rear ends of the beam 41 as at 44, and the support units 43 have wheels or rollers 45 journalled therein as at 46.

The numeral 47 indicates a lever that is pivotally connected to the upper portion of the standard 38 as at 48, and the lever 47 is also pivotally connected to the rear end of the bar 35 by means of the pivot pin 49. The lever 47 includes an integral generally L-shaped portion 51, and the portion 51 and the main body of the lever 47 are provided with a plurality of spaced apart openings such as the openings 50 whereby the pin 49 can be arranged in engagement with different of these openings 50 in order to provide a means for adjusting the connection between the lever 47 and bar 35.

The numeral 52 indicates a bracket that is pivotally connected to the lever 47 as at 53, and a pair of mercury switches 54 and 55 are suitably affixed to the bracket 52.

According to the present invention there is provided a manually operable control unit which is indicated generally by the numeral 56, and the control unit 56 includes a casing or hollow housing 57 that is suitably supported as at 58 adjacent the cab 70 of the machine 20, and the numeral 71 indicates the usual steering wheel for the machine, FIGURE 1. The housing 56 has a dial plate or face 59 thereon, and there is provided indicia or scale markings 60 on the dial 59, and there is also provided on the dial face 59 indicia such as the expression "Up-Grade," and "Down-Grade," as indicated by the numerals 61 and 62 respectively. The numeral 63 indicates a movable pointer or hand which has an indicating end 64 for coaction with the scale markings 60, and the pointer 63 is connected to the outer end of a drive shaft 65 which has a worm 66 thereon, FIGURE 5. The worm 66 is arranged in meshing engagement with a gear 67 which is suitably connected to a driven shaft 68, and the shaft 68 is supported by a shoulder 69 within the housing 57. The numeral 72 indicates a flexible cable assembly which serves to operatively connect the control unit 56 to the bracket 52, and it will be seen that the flexible cable assembly 72 includes an outer stationary sheath or casing 73 which has a movable wire 74 arranged therein, and one end of the wire 74 is connected as at 75 to the rotary gear 67, while the other end of the wire 74 is connected as at 76 and 77 to the pivotally mounted bracket 52 which carries the mercury switches 54 and 55.

The numeral 78 indicates a vertically disposed plate which is secured as by welding to a suitable portion of the body 21, FIGURE 7, and the plate 78 has a pair of solenoids 80 and 81 clamped or attached thereto as at 82. The solenoids 80 and 81 each include an inner movable element or member 83, and the upper and lower members 83 are joined or inner connected by connecting member 84. The numeral 86 indicates a movable link or bar which is connected as at 87 to the connecting member 84, FIGURE 4, and the link 86 extends through an opening or cutout 85 in the plate 78, and the rear end of the link 86 is pivotally connected as at 79 to the body 21.

As shown in the drawings, the link 86 is provided with a plurality of spaced apart openings or apertures 88, and the numeral 89 indicates a vertically movable or adjustable rod which has a yoke 90 on the lower end thereof, and the yoke 90 is adapted to be connected to one of the openings 88 as for example by means of a pivot pin or bolt 91. The upper end of the rod 89 is adapted to be arranged in engagement with one of a series of openings or apertures 92 in a bar or arm 93, FIGURE 4. The bar 93 is connected to a pin 94 which may be supported as at 95 on the body 21, FIGURE 7. The numerals 98 and 99 indicate links which form part of a suitable connecting link means between the pin 94 and a conventional hydraulic control valve 100, and the control valve 100 is adapted to have a plurality of hydraulic hoses or lines 101 connected thereto, and these lines 101 may be conventionally connected to a hydraulic pump, reservoir tank, as well as to the hydraulic cylinders 29 and 30 in order to control raising and lowering of the section 26 whereby the blade 27 will be automatically positioned at the desired location.

As shown in FIGURE 4 there is provided a source of electrical energy 102 which may be the battery of the machine 20, and the electrical circuit includes wires or conductors 103 and 104 that are electrically connected to the solenoid 81, and wires 105 and 106 are electrically connected to the solenoid 80. The switches 54 and 55 are electrically connected into the circuit as at 107 and 108. The numeral 109 indicates a switch which may be of the type that can be used for controlling operation or actuation of the circuit, and the switch 109 is adapted to have two positions so that for example it can be moved to the dotted line position shown in FIGURE 4 for manual operation, or else the switch can be set at the solid line position for automatic operation.

In use, with the parts arranged as shown in the drawings, it will be seen that the machine 20 is adapted to be driven or operated along a surface such as the ground 110 and the blade 27 can be used for moving earth such as the earth indicated by the numeral 111 in FIGURE 1. Normally the position of the blade 27 is controlled manually so that for example when it is desired to establish a particular grade the operator of the machine 20 moves a lever or the like in order to try and set the blade 27 at the proper position to cause a particular grade to be formed or made. This is not accurate and is tiresome and time consuming, and the present invention overcomes these disadvantages by providing a means for automatically maintaining the blade 27 at the desired position so that a true grade can be made in the ground being worked without the necessity of trying to continuously adjust the blade 27 by the hand control.

It will be seen that the desired results are accomplished due to the provision of the parts such as the parts or mechanism 31, and it will be seen that the mechanism 31 is mounted rearwardly of the blade 27, so that for example as the machine 20 moves from left to right in FIGURE 1, when the wheels such as the wheels 45 encounter a depression or hump in the ground or the like, the standard 38 will be moved down or up since the standard 38 is pivotally connected as at 42 to the beam 41, and the beam 41 has the wheel supporting units 43 connected thereto as at 44. As the standard 38 automatically moves in a vertical plane due to the wheels 45 encountering a depression or raised ground surface, it will be seen that the arm 36 will pivot since the arm 36 is pivotally connected to the standard 38 as at 40, and the front end of the arm 36 is pivotally connected as at 37 to the member 33. The member 33 is hingedly connected as at 34 to the element 32, and this hinge arrangement 34 permits the mechanism 31 to have some lateral adjustment so that there will be no binding between the parts. As the standard 38 moves up or down depending upon whether the wheels 45 are engaging a raised ground surface or a depressed ground surface, the lever 47 will be pivoted about an axis extending through the pivot pin 49 since the lever 47 is pivotally connected as at 48 to the upper end of the standard 38. The bracket 52 is connected as at 53 to the lever 47, and the pair of mercury switches 54 and 55 are suitably affixed to the bracket 52 so that as the lever 47 pivots about the pivot pin 49, the switches 54 and 55 will open or close depending upon the direction of pivotal movement of the lever, and since the switches 54 and 55 are electrically connected as at 107 and 108 to the solenoids 81 and 80, it will be seen that this opening and closing action of the switches 54 and 55 can be used to energize or deactivate the solenoids 80 and 81 so that the movable elements 83 within the solenoids can be selectively extended or retracted.

The bar 86 is connected to the member 84 as at 87, and the rod 89 has its lower portion 90 pivotally connected to the bar 86 as at 91, so that as the bar 86 is moved by selective actuation of the solenoids, the rod 89 will be selectively moved up or down, and since the upper end of the rod 89 is connected as at 92 to the bar or member 93, it will be seen that this movement of the rod 89 will cause pivotal movement of the bar 93 about an axis extending through the pin 94. The link means which may include elements such as the elements 98 and 99 serve to operatively connect the movable pin 94 to the hydraulic control valve 100 so that this movement of the bar 93 will cause corresponding movement of the links 98 and 99 to selectively open and close the hydraulic control valve 100. The control valve 100 is adapted to be connected to the usual hydraulic accessories such as the hydraulic pump, reservoir tank or the like, and hoses similar to the hoses or lines 101 serve to connect the valve 100 into a hydraulic circuit which includes the hydraulic cylinders such as the cylinders 29 and 30 so that these cylinders 29 and 30 can be extended or retracted in order to raise or lower the support section 26. Since the blade 27 is rigidly affixed to the support section 26, it will be seen that the automatic adjustment of the support section 26 by the hydraulic cylinders will cause corresponding movement of the blade 27 so that the blade will automatically move to the desired position in response to movement of the wheels 45 whereby a true grade can be established which does not require constant attention of the operator of the machine.

The parts can be made of any suitable material and in different shapes and sizes.

In addition, the present invention further includes a means for manually adjusting the mechanism 31 so that for example an up-grade or down-grade can be made, and to accomplish this there is provided a manual control unit which is indicated generally by the numeral 56, and this control unit 56 is adapted to be arranged in a convenient location such as adjacent the cab 70 of the machine 20. To adjust the control unit 56 it is only necessary to manually move the hand 63, as for example the hand 63 can be moved from the solid line position of FIGURE 4 to the broken line position of FIGURE 4 and the scale markings 60 provided means for accurately positioning the pointer 64 so that the operator can set the device to accomplish the desired grade. As the hand 63 is manually moved, it causes corresponding rotation or movement of the shaft 65, and since the shaft 65 has the worm 66 thereon, and since the worm 66 meshes with the gear 67, it will be seen that this movement of the hand 63 causes rotation of the gear 67 which is mounted on the shaft 68. The movable wire 74 of the flexible cable assembly 72 is connected as at 75 to the gear 67 so that as the gear 67 rotates, the wire 74 will be moved in or out of the sheath 73, and since the other end of the wire 74 is connected as at 76 and 77 to the support for the switches 54 and 55, it will be seen that the movement of the wire 74 can be used to move the switches 54 and 55 to a desired position which is predetermined to cause the solenoids to be actuated at the proper time to maintain a desired grade by the blade 27.

While the present invention has been shown being used with or on a land grader or leverler as indicated by the numeral 20, it is to be understood that the present invention is not limited or restricted to any particular type of earth moving machine, and for example it can be used in conjunction with other types of equipment or machinery such as a tractor operated scraper blade or the like.

The present invention can be used in conjunction with machines that are performing various types of grading operations as well as ditching and sloping work, and the attachment of the present invention can be connected to a conventional earth moving machine without requiring any extensive alterations to the earth moving machinery. The present invention will work on practically any type of earth moving equipment although it is especially suitable for a grader, and the present invention is efficient and accurate so that for example the attachment can perform to a degree of one-sixteenth of an inch of grade in one-hundred feet.

The flexible cable assembly permits the operator to sit or adjust the mechanism from level to any degree of grade desired. The leads or wires from the contactors or switches 54 and 55 lead to and bypass the manual controls, and the controls of the blade may include a reversible motor or a two-way hydraulic ram. The upper bar 35 is rigidly attached to the element 33 as by welding so that any movement of the blade 27 up or down will tilt the mercury contactors 54 and 55 in order to pull the blade back on the true grade. The lower bar or arm 36 has a floating mounting, and the members 35 and 36 are connected to the flanged hinge section 33, so that if the blade 27 is set at any angle, the attachment 31 will trail directly behind the blade 27 and in line with the machine. The mercury contactors 54 and 55 may be set by the adjusting screw on the level to hold the blade at any degree of angle from side to side. The bars and carriage may be made essentially of angle iron or the like which is suitably secured together as by welding.

The attachment of the present invention can be used for various types of earth moving equipment wherever a true grade is required such as land leveling for irrigation or farm land, highway construction work and other jobs, and it will take the guess-work out of grading and land leveling. The attachment is fully automatic and it can be attached and detached in only a few minutes and is a practical device that can be made and sold at a low cost. The mechanism can be operatively connected to any blade such as a road patrol grader, graders, land planes or any piece of land moving equipment where a true grade is required. The flexible cable mechanism may be constructed so that one turn of the screw will raise or lower the blade one-tenth of one degree. The wheels 45 and associated parts of the dolly mechanism or apparatus are arranged to help prevent blade bucking, and the blade will level off instantly. The attachment of the present invention functions as an automatic control on various types of land leveling equipment where a grade must be continued or set up on a constant level or any degree of a given level or angle, and the attachment is a liquid level which electrically controls the hydraulic action which in turn controls the blade to create a true predetermined level, grade or angle.

The attachment is adapted to be arranged contiguous to and operatively connected to a blade such as the blade 27, and the front of the bar 35 has a rigid connection with the element 33, and the arm 36 provides a floating tow bar.

The attachment can be adapted to various types of earth moving equipment where a true grade is required and will give a true grade that will not vary more than for example one-eighths of an inch in one-hundred feet of travel, and the present invention includes a positive electric hydraulic automatic control which assures a grading to within these limits and increase the efficiency of the various earth grading equipment, to a considerable extent. The attachment is efficient, inexpensive and is a needed piece of apparatus. The wheels 45 may be swivelly connected as at 43 and 44 to the beam or bar 41. The hinge pin 34 is of a type which can be readily removed to permit quick disassembly of the hinge and associated parts. The yoke 90 on the lower end of the rod 89 is in the form of a turnbuckle so as to permit fine adjustment of the parts. The control dial or unit 56 is mounted on the dash of the tractor or other piece of equipment so that the operator can adjust the automatic control to any desired grade up or down, and this unit may be graduated in one-tenth of a foot or fraction thereof per hundred feet of travel. The switch 109 is a master switch for changing from automatic to manual control.

Although the invention herein described is fully capable of achieving the objects and providing the advantages hereinbefore mentioned, it is to be understood that it is merely illustrative of the presently preferred embodiment of the invention and that it is not to be limited to the details of construction herein described other than as defined in the appended claims.

What is claimed is:

1. In an earth moving machine, a body having ground engaging wheels and an engine, a frame extending forwardly from said body and said body having ground engaging wheels on the front portion thereof, a movable support section adjustably mounted below said frame, a blade operatively connected to said support section, hydraulic cylinders connected to said frame and to said support section for raising and lowering said support section, a leveling mechanism comprising a base piece secured to said support section, a movable element hingedly connected to said base piece, a horizontally disposed bar having its front end secured to said movable element, an arm arranged below said bar and said bar having its front end pivotally connected to the lower portion of said movable element, a vertically disposed standard having the rear end of said arm pivotally connected thereto, a beam having the lower end of said standard pivotally connected thereto, a plurality of support units depending from the ends of said beam, wheels journaled in said support units, a lever pivotally connected to the upper portion of said standard, and said lever being also pivotally connected to the rear end of said bar, a bracket connected to said lever, a pair of mercury switches connected to said bracket, a manually operable control unit mounted on said body and said control unit comprising a housing having a drive shaft rotatably arranged therein, a worm on said shaft, a pointer operatively connected to said shaft, a dial face connected to said housing and having indicia thereon for coaction with said pointer, a shoulder arranged in said housing, a driven shaft rotatably connected to the shoulder in said housing, a gear connected to said driven shaft and meshing with said worm, a flexible cable assembly including an outer stationary sheath and an inner movable wire which has one end connected to said gear and its other end operatively connected to said bracket, a plate secured to said body, upper and lower solenoids supported by said plate, an electrical circuit including conductors electrically connecting said solenoids to said mercury switches, movable members in said solenoids, a connecting member joining said movable members together, there being an opening in said plate, a movable link projecting through the opening in said plate and having an intermediate portion thereof connected to said connecting member and one end of said link being pivotally connected to said body, a vertically disposed rod having a yoke on its lower end pivotally connected to said link, a hydraulic control valve operatively connected to said hydraulic cylinders, and link means for operatively connecting said rod to said valve.

2. In an earth moving machine, an adjustable blade, a leveling mechanism comprising a base piece, a movable element hingedly connected to said base piece, a horizontally disposed bar having its front end secured to said movable element, an arm arranged below said bar and said bar having its front end pivotally connected to the lower portion of said movable element, a vertically disposed standard having the rear end of said arm pivotally connected thereto, a beam having the lower end of said standard pivotally connected thereto, support units depending from the ends of said beams, wheels journaled in said support units, a lever pivotally connected to the upper portion of said standard, said lever having a portion thereof pivotally connected to the rear end of said bar, a bracket connected to said lever, a pair of switches connected to said bracket, a manually operable control unit comprising a housing having a drive shaft arranged therein, a worm on said drive shaft, a pointer connected to said drive shaft, a dial face having indicia thereon for coaction with said pointer, a shoulder in said housing, a driven shaft rotatably connected to said shoulder, a gear connected to said driven shaft and said gear meshing with said worm, a flexible cable assembly including an outer sheath and an inner movable wire having one end connected to said gear and its other end connected to said bracket, a plate having upper and lower solenoids connected thereto, conductors electrically connecting said solenoids to said switches movable members in said solenoids, a connecting member joining said movable members together, said plate having an opening therein, a movable link projecting through the opening in said plate and having an intermediate portion thereof connected to said connecting member, a vertically disposed rod having a yoke on its lower end pivotally connected to said link, a hydraulic control valve, and means operatively connecting said hydraulic control valve to said rod.

References Cited in the file of this patent

UNITED STATES PATENTS

| | | |
|---|---|---|
| 2,527,840 | Mott | Oct. 31, 1950 |
| 2,622,499 | Fraga | Dec. 23, 1952 |
| 2,636,290 | Bell | Apr. 28, 1953 |
| 2,755,721 | Rusconi | July 24, 1956 |
| 2,792,651 | Hobdary | May 21, 1957 |
| 2,904,911 | Colee | Sept. 22, 1959 |